United States Patent [19]

Eckel et al.

[11] Patent Number: 4,850,244
[45] Date of Patent: * Jul. 25, 1989

[54] FLYWHEEL

[75] Inventors: Hans-Gerd Eckel, Hirschberg-Leutershausen; Volker Grassmuck; Benno Jörg, both of Weinheim; Klaus Kurr, Weinheim-Hohensachsen; Eberhard Sommer, Weinheim-Laudenbach, all of Fed. Rep. of Germany

[73] Assignee: Firma Carl Freudenberg, Weinheim/Bergstr, Fed. Rep. of Germany

[*] Notice: The portion of the term of this patent subsequent to Aug. 1, 2006 has been disclaimed.

[21] Appl. No.: 890,494

[22] Filed: Jul. 25, 1986

[30] Foreign Application Priority Data

Aug. 6, 1985 [DE] Fed. Rep. of Germany ....... 3528175

[51] Int. Cl.$^4$ .............................................. F16F 15/10
[52] U.S. Cl. ........................................ 74/574; 74/572;
132/106.1; 132/104 C; 464/89
[58] Field of Search ...................... 74/574, 573 F, 572,
74/7 C, 7 R; 192/48.5, 70.17, 104 C, 106.1;
415/119; 464/89, 90, 87, 24

[56] References Cited

U.S. PATENT DOCUMENTS

| 2,746,587 | 5/1956 | Spase | 192/194 C |
|---|---|---|---|
| 3,301,009 | 1/1967 | Coulter | 74/574 |
| 3,990,324 | 11/1976 | Fishbaugh et al. | 74/574 |
| 4,095,485 | 6/1978 | Hiersig | 74/574 |
| 4,370,900 | 2/1983 | Hartz | 74/574 |
| 4,433,771 | 2/1984 | Caray | 192/106.1 |
| 4,474,276 | 10/1984 | Loizeau | 192/106.1 |
| 4,556,136 | 12/1985 | Lech | 192/106.1 |
| 4,558,773 | 12/1985 | Schafer | 192/106.1 |
| 4,560,367 | 12/1985 | Wolf et al. | 192/106.1 |
| 4,583,912 | 4/1986 | Ball et al. | 74/574 |
| 4,601,678 | 7/1986 | Wolf et al. | 192/106.1 |
| 4,624,351 | 11/1986 | Lutz et al. | 74/574 |
| 4,728,314 | 3/1988 | Eckel et al. | 464/89 |

FOREIGN PATENT DOCUMENTS

| 678017 | 6/1939 | Fed. Rep. of Germany ... 192/106.1 |
|---|---|---|
| 2733880 | 2/1978 | Fed. Rep. of Germany ... 192/106.1 |
| 2639661 | 3/1978 | Fed. Rep. of Germany ... 192/106.1 |
| 2746127 | 4/1979 | Fed. Rep. of Germany ... 192/106.1 |
| 3502669 | 7/1986 | Fed. Rep. of Germany ... 192/106.1 |
| 630275 | 10/1949 | United Kingdom ............. 192/106.1 |
| 996883 | 6/1965 | United Kingdom ............. 192/106.1 |
| 2121914 | 1/1984 | United Kingdom ................. 74/574 |

OTHER PUBLICATIONS

Handbook of Tables for Applied Engineering Science, 2nd Edition, CRC Press, pp. 623–625 (Table 6-3-0-6-33).

Primary Examiner—Vinh Luong
Attorney, Agent, or Firm—Felfe & Lynch

[57] ABSTRACT

A flywheel has first and second axially-spaced, coaxial flyrings. At least one resilient element connects the flyrings for permitting relative rotational displacement therebetween. A damping device also connects the flyrings operatively in parallel with the resilient element for impeding the relative rotational displacement of the flyrings permitted thereby after some, lost relative rotational displacement up to about ±30°.

12 Claims, 5 Drawing Sheets

FLYWHEEL

BACKGROUND OF THE INVENTION

The invention relates to the flywheel for an automotive drive train, for example.

A flywheel is known from German patent publication OS No. 29 31 423. It has a resilient element and damping device series connecting first and second flyrings of the flywheel but arranged so that the damping device becomes operational only when the torque transmitted would exceed the torque-transmission strength of the resilient element. The damping device thus serves merely to limit the torque transmitted between the flyrings to a very specific value. Below that value, the damping device is ineffective; above that value, the resilient element is ineffective. Under normal operating conditions, therefore, it is rarely possible to suppress transmission of unwanted vibrations through the flywheel.

SUMMARY OF THE INVENTION

An object of the invention is, therefore, to provide a flywheel which substantially prevents the transmission of unwanted vibration through the flywheel under normal operating conditions.

To this and other end, the invention provides a flywheel having a first flyring for connection to a rotationally-driving shaft and a second, coaxial flyring for connection to a shaft rotationally driven thereby. At least one resilient element for permitting relative rotational displacement of the flyrings and a damping device operatively in parallel with the resilient element for impeding the relative rotational displacement permitted thereby connect the first and second flyrings to each other for rotationally driving the second flyring with the first. The damping device is arranged for some, but relative rotational displacement between the flyrings, up to about 30°, before it becomes operative for impeding the relative rotation between the flyrings. The lost relative rotational displacement may be by free travel.

The lost motion of the damping device of the flywheel of the invention keeps vibrations of small amplitude away from the damping device for isolation by the resilience of the resilient element. The small-amplitude vibrations cannot be, therefore, transmitted through the flywheel, such transmission being undesirable. The undesired transmission of such vibrations is reliably prevented.

When vibrations of larger amplitude are introduced, however, the lost motion of the damping device is exceeded. The damping device then becomes operative and, because it is in parallel with the resilient element, damps the vibrations between the flyrings. In general, this reliably prevents the occurrence of resonance vibrations of excessive amplitude, too.

Preferably, the resilient element and the damping device are annular and coaxial with the first and second flyrings. Unbalance is avoided thereby, which suits the flywheel for use in a power train in which very high rotational speeds occur.

The resilient element is preferably made of a rubber-elastic material. Such material, in contrast to metallic materials, has inherent damping properties which promote faster decay of low-amplitude vibrations and provide some relief for the damping device. It will be understood, however, that because of a pronounced difference in effectiveness, the damping properties inherent in a rubber-elastic resilient element are not substitutable for the separate damping device of the invention.

In one preferred embodiment, the resilient element unites generally-concentric, radially-opposed, axially-oriented retaining surfaces of the first and second flyrings. This results in a very short overall axial length of the flywheel that facilitates its use. In another preferred embodiment, the diameter of the flywheel can be reduced by having the resilient element unite axially-opposed, generally-radial retaining surfaces of the first and second flyrings.

Hybrids of these two designs might also be considered. For example, an embodiment might have at least one resilient element holdingly between axially-opposed retaining surfaces of the first and second flyrings and at least one further resilient element holdingly between radially-opposed retaining surfaces of the first and second flyrings. Coaxial guidance of the two flyrings with respect to each other will then be improved.

In a preferred embodiment having either radially-or axially-opposed retaining surfaces, the flyrings are spaced from the resilient element except at the retaining surfaces. This keeps any heat that is introduced into either flyring away from the resilient element, which lengthens its service life, especially if it is made of a polymeric, e.g., rubber-elastic material.

The last-described preferred embodiment can be refined further by sealing the hollow space defined by the space between the resilient element and at least one of the flyrings and filling the sealed hollow space with a liquid. The centrifugal force of rotating the flywheel then builds up a pressure in the liquid that is a function of the rotational speed of the flywheel. With proper design, the pressure will substantially or entirely prevent deformation of the resilient element due to the centrifugal force. This facilitates use of the flywheel in applications where high rotational speeds occur.

In a preferred embodiment, the damping device is a driving disk mounted on one of the first or second flyrings for rotation therewith and engageable with the other flyring. This arrangement lends itself particularly well to low-cost manufacture and assures good stability and reliable operation.

The arrangement also lends itself to the lost motion of the damping device for the effective damping only of vibrations above a given minimum, up to about 30° relative rotation of the flyrings. For this, dogs on the driving disk and the other flyring are spaced from each other in the circumferential direction of the relative rotation of the flyrings for engagement upon the minimum amplitude of the relative rotation determined by the spacing of the dogs. The flyring having the driving disk is thus readily relatively displaceable angularly with the driving disk, without any resistance from the driving disk, until the dogs of the driving disk engage the dogs of the other flyring. The resulting relative rotation or angular displaceability of the flyrings is, however, limited by the relative spacing of the dogs of the driving disk and other flyring, the dogs forming stops for the relative rotation upon contact. Larger relative rotational displacements of the flyrings then cause the damping device to become effective, the damping device then being operatively in parallel with the resilient element for at least more co-joint rotation of the flyrings.

The range of relative angular displacement over which the two flyrings are coupled together with only the resilient element operational can be limited as desired. However, an angular range of about ±30° should not be exceeded. In machine construction generally, a limitation to relative flyring rotation of about ±10° has been found advantageous. In automotive engineering, a limitation to about ±5° is considered appropriate. In both fields of application, optimal suppression of disturbing vibrations over the entire frequency range can be achieved with these limits.

When a mechanically-operating damping device is used, such as that with the spaced dogs described above, for example, its damping action can be improved by coupling it to the one flyring with at least one friction lining. In the described, spaced-dog embodiment, for example, its driving disk is advantageously pressed against a friction lining between it and the one flyring on which it is mounted for rotation for angular displacement relative thereto. This ads its damping when the dogs engage each other.

The damping device may be, alternatively, a viscosity damper. For this, an incompressible liquid in a hollow space between one of the flyrings and the other flyring and/or the resilient element has a viscosity of from about 100 to about 200,000 centistokes. The damping device is formed by the liquid and the surfaces of the relatively-rotatable resilient element and first and/or second flyring defining the hollow space and which are, therefore, wetted by the liquid. The supplemental use of the liquid for preventing deformation of the resilient element by centrifugal force, as before described, is also recommended.

The preferred designs of viscosity dampers are characterized mainly in that the surface in the liquid filled space that are capable of relative rotational displacement have damping projections that move toward one another for the lost motion and overlap one another for the damping. Thus, the damping projections are spaced farther apart in the angularly undisplaced state of the flyrings than when these are relatively displaced.

The damping projections preferably are uniformly distributed around the circumferences of axially-successive, coaxial disks rotatable with or part of the respective flyrings. The spacing of the daming projections of the opposed disks of the two flyrings from each other differs considerably, at least by a factor of 1.5, between the undisplaced and relative displaced states of the flyrings. The opposed damping projections are, thus, spaced farther apart in the undisplaced state of the two flyrings than in their displaced state, the resulting damping forces being, therefore, considerably smaller in the undisplaced state.

Vibrations of large amplitude are damped to a higher degree in this way, whereas vibrations of small amplitude are not, the amplitude differentiation depending on the dimensional coordination of the damping projections. The viscous damping device can, thus, also provide differential effectiveness for vibrations of different amplitudes, depending on its construction. This is obtained, however, without precision parts that are subject to contact wear, which is a great advantage from the standpoint of ease of manufacture and extended service life.

In a few applications, it has proved advantageous for the differential spacings between the opposed damping projections to pass into one another in single or multiple steps. The degree of the damping action obtained then increases as a function of the relative rotational displacement between the two flyrings. This will be useful when a sudden load change in an engine power train occurs, for example. However, with the larger spacing between damping projections passing smoothly into the remaining, adjoining surfaces, sudden variations in the damping force, which may conceivably result in impulse-like starting of the entire power train of a motor vehicle, can be prevented.

In all of the viscosity dampers described above, the overall damping action is a function of the size of the surfaces wet by the damping liquid, as well as their spacing, as described above. If necessary, these can be enlarged by adding at least one annularly-projecting shoulder to the resilient element and/or to the first or second flyring.

BRIEF DESCRIPTION OF THE DRAWINGS

Preferred embodiments which illustrate but do not limit the invention will now be described in greater detail with reference to the accompanying drawings, wherein.

DESCRIPTION OF THE PREFERRED EMBODIMENTS

Figure 1:
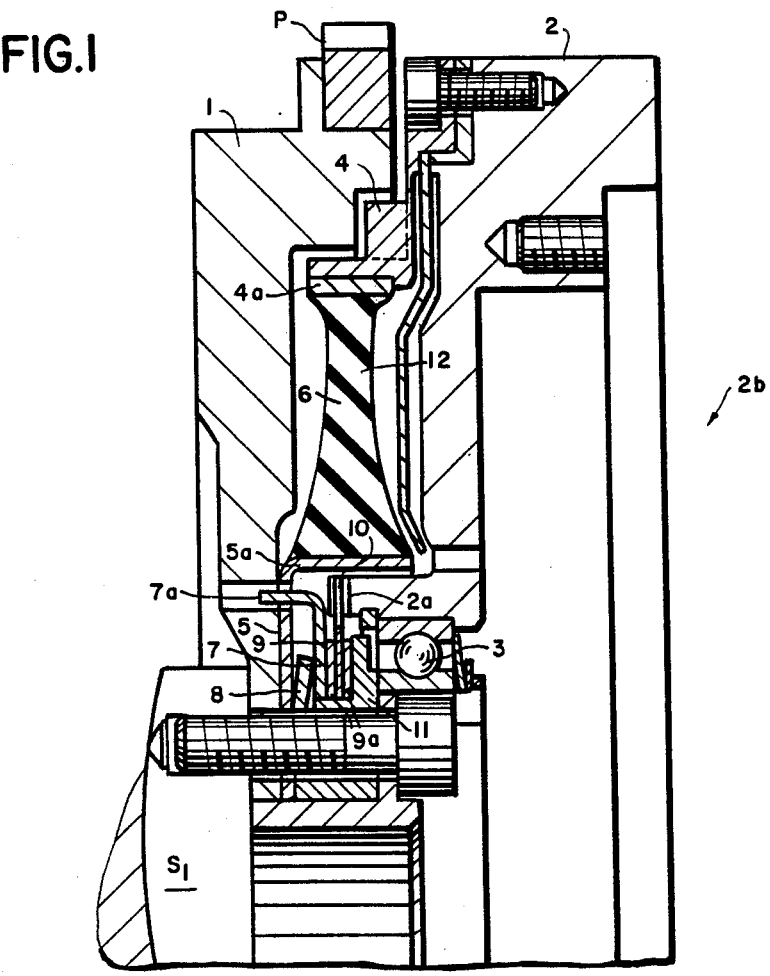
FIG. 1 is half an axial elevation, partly in cross section, of one mechanically-damped preferred embodiment.
Figure 2:
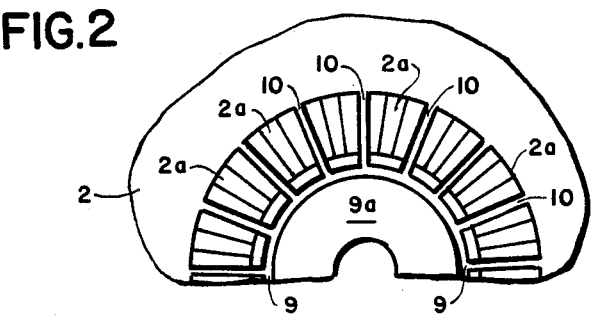
FIG. 2 is an end view, transverse to that of FIG. 1, of a portion of the embodiment shown in FIG. 1.

The flywheel shown in FIGS. 1 and 2 is intended for use between the engine and transmission of a motor vehicle. It has a first flyring 1 on a rotationally-driving engine shaft S1, the first flyring having gear teeth P (only one shown) for the starter drive pinion thereabout. A second, axially-successive, coaxial flyring 2 is arranged for connection to a driven, transmission shaft (not shown), of the motor vehicle by a clutch plate (not shown in FIG. 1, D in FIG. 4) on a clutch plate face at 2b. The first and second flyrings 1, 2 are supported on each other for relative rotational displacement by a bearing 3. They substantially enclose an annular hollow space having radially-opposed, axial-oriented, ring-shaped retaining surfaces 4a, 5a of the second and first flyrings, respectively, to which a resilient element 6 is connected.

The resilient element 6 is, therefore, also annular in shape. It is made of a rubber-elastic material which is secured to the retaining surfaces 4a, 5a by vulcanization. The outermore retaining surface 4a is part of a composite retaining ring 4 which is bolted to the second flyring 2 with a heat-insulating washer or disk 12 interposed therebetween to project generally radially inward substantially the radial length of the annual space between the flyings. The disk 12 shieldingly insulates the resilient element 6 from undesired heating, which could degrade its rubber-elastic material, from flyring 2, which could be heated by its clutch-plate face, for example. The innermore retaining surface 5a is on a retaining ring 5 which is L-shaped in axial cross section and spring and pin held on the first flyring 1.

For this, one leg of the L-shaped, angular profile of the retaining ring extends in the radial direction and has apertures uniformly distributed circumferentially thereabout. Axially-projecting dogs 7a of an otherwise radial pressure ring 7 mate with the apertures. The pressure ring 7 is pressed by a disk spring 8 supported on the retaining ring 5 against a friction ring 9a on one side of a driving disk 9 which also has a friction ring 9a on its other side in the axial direction.

The friction ring 9a on the other side of the driving disk 9 is pressed toward the pressure ring, disk spring and retaining ring by a flange of an angular ring 11, the friction rings 9a providing for angular displacement relative thereto. The flange of the angular ring, which extends radially outward, thus forms a pressure-abutment surface for the pressure ring 7, the latter two elements flanking the driving disk 9 and its friction linings 9a in the axial direction. The angular ring 11 is fastened to the flyring 1 so that it is not capable of angular displacement relative thereto, i.e., for rotation therewith.

The driving disk 9 has radial, circumferentially-spaced, outwardly-projecting, finger-like extensions or dogs 10 uniformly distributed around its outer circumference and the second flying 2 has circumferentially-spaced axial projections or dogs 2a in proximity to its inner circumference which extend into the spaces between the finger-like projections or dogs 10 of the driving disk. The axial projections or dogs 2a of the second flyring 2 are uniformly spaced from the finger-like extensions or dogs 10 of the driving disk 9 circumferentially of the driving disk when the resilient element 6 is not circumferentially stressed. As a result, the damping device formed by the parts 5, 7, 8, 9 and 11 becomes operational only after a certain, minimal, relative rotational displacement of the flyrings 1,2 set by the uniform circumferential spacing of the dogs has been exceeded.

Figure 3:
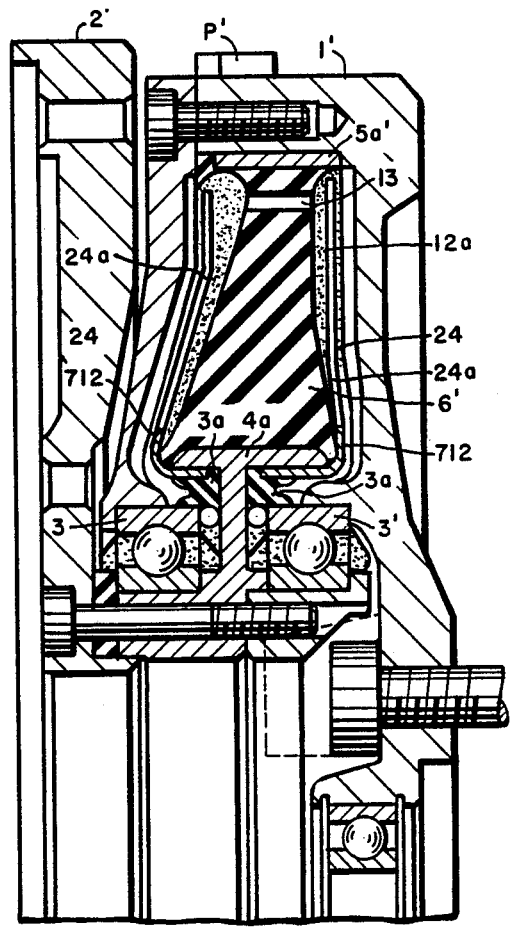
FIG. 3 is half an axial elevation, partly in cross section, of another, viscously-damped preferred embodiment.
Figure 3A:
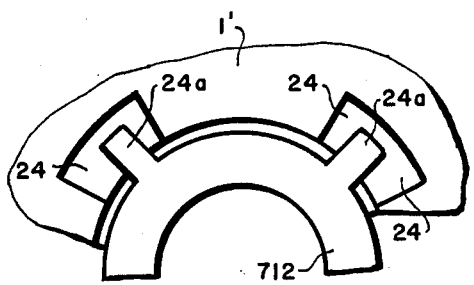

Portions of the embodiment shown in FIG. 3 are similar to portions of the embodiment shown in FIGS. 1 and 2 and just described in function, if not also in structure, and are, therefore, correspondingly identified to require only general description. Here, too, therefore, an annular, rubber-elastic resilient element 6' is secured to radially-opposed, axially-oriented retaining surfaces 4a', 5a' of the second and first flyrings 2, 1, respectively.

In the embodiment of FIG. 3, however, the flyring 1' is composite to form an outwardly-sealed annular chamber for receiving the resilient element 6' with an axial, annular space on each side of the resilient element to the opposite boundary wall of the first flyring 1. Each of the axial, annular hollow spaces so formed is dynamically sealed inwardly between the flyrings with a dynamic seal 3a between the flyring 2' and a casing of a bearing 3' on the flyring 1' and filled with silicone oil 12a having a viscosity from 100 to 200,000 centistokes.

Disks 712 with projections 24a are connected to the flyring 2' at its retaining surface 4a' so that projections 24a project generally radially in the axial, hollow spaces substantially all along the resilient element 6' to the other retaining surface 5a' of flyring 1', similarly to the heat-insulating disk 12 in FIG. 1. The projections 24a of the disks are respectively at very small distances from axially-adjacent boundary elements 24 of the first flyring. The projections 24a and boundary elements 2 are uniformly distributed circumferentially and directed radially outward as shown for damping projections 15a, 15b in FIG. 5. When the resilient element 6' is not elastically deformed, i.e. when it is not torsionally displaced, the disk projections 24a are arranged in the middle over the pocket between circumferentially-successive boundary elements 24. The oil 12a in the axial, annular hollow spaces therefore also wets both sides of each disk 712. A rotational displacement of the first flyring 1' relative to the second flyring 2' thus results, not only in elastic deformation of the resilient element 6', but also in relative viscousdamping of the displacement with the oil 12a as the relative rotational displacement becomes sufficiently big to move the disk projections 24a in the circumferential direction out of the region of the pockets between boundary elements 24 to that of very small axial distance to the boundary elements 24 of the first flyring 1. The annular, liquid-filled hollow spaces which bound the resilient element 6' on both sides in the axial direction communicate with each other through at least one duct 13 through the resilient element in proximity to its outer periphery. A relative pressure rise produced in either of the two spaces by the rotation of the flywheel, i.e., centrifugally, an angular displacement of one of its flyrings with respect to the other, or heat, etc. is, therefore, completely equalized. This provides good mechanical reinforcement of the resilient element 6' against deformation by the centrifugal force and avoids adverse effects of even one-sided exposure to heat. This design is, therefore, suited for applications where extremely high stresses are encountered.

Reinforcing the resilient element against centrifugal deformation can be achieved most readily if the oil 12a has the same density as the resilient element. Such oils and resilient materials are known. Filling the hollow spaces with the oil up to the radially-inner boundary surface of the resilient element, i.e., its retaining surface 4a, when the flywheel is rotating will, in this case, produce the desired result.

Figure 4:
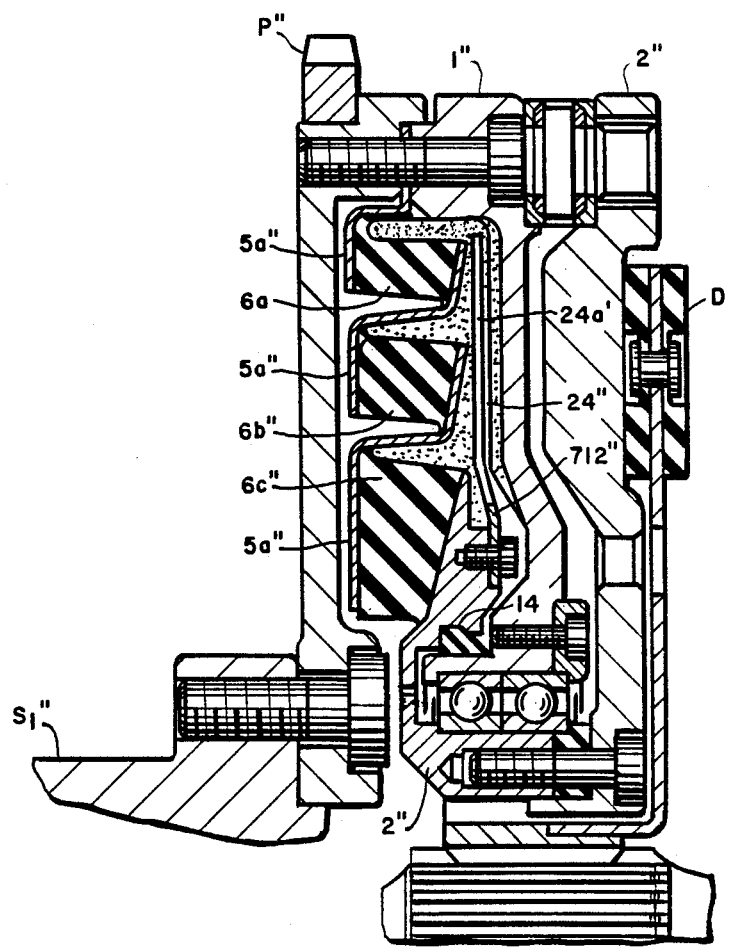
FIG. 4 is half an axial elevation, partly in cross section, of still another, viscously-damped preferred embodiment.

In cases where the resilient element has a higher or lower density than the oil, the same result can be obtained by more- or less-extensive filling of the hollow space(s) about the resilient element while the shaft coupling is rotating. (For more-extensive filling, an embodiment as shown in FIG. 4 or the like would be required.) The exact level of filling required in a given case can be determined by trial or calculation. In most cases, however, it can be determined empirically.

The hollow spaces containing the oil 12a are bounded by the first flyring 1' outwardly in the radial direction and on both sides in the axial direction in a liquid-tight manner. Because rotation of the flyring 1' distributes the oil which they contain annularly, the hollow spaces require no sealing radially inwardly when provision is made for preventing the volume of oil necessary for its operations from escaping when the flyring 1' is at rest. Dynamic seals 3a permit rotation of the flyrings and provide static sealing contact between flyring 1' and a casing of ball bearing 3'.

However, it will be advisable to use fully dynamic seals 3a when there is a possibility that foreign matter may lodge in the hollow spaces in normal operation of the flywheel. Dynamic seals may be used in other areas in other embodiments of the flywheel, such as between flyrings juxtaposed radially outwardly of the hollow spaces, provided allowance is made for the effect thereon of the pressure buildup from centrifugal force. To avoid this, therefore, it is preferably to correlate the seal(s) with the inside diameter of the flywheel as shown for seals 3a in FIG. 3, for example.

The flywheel shown in FIG. 4 is functionally similar to the viscously-damped one just described. It too, uses a viscosity damper. However, because the resilient element is subdivided into three concentric rings 6a''', 6b''', 6c''', secured by axially-opposed retaining surfaces 5a'' to retaining surface 4a'' of the first and second flyring, 1'', 2'', respectively, it is wet only on radially-outermore surfaces by the viscous liquid 12a'' in only one of annular hollow spaces of flyring 1''. The viscuous liquid 12a'' fills the annular hollow space radially inwardly to the level of the radially inner boundary surface of the resilient element ring 6b'' when the flywheel is rotating, thus preventing centrifugal deformation of the outer resilient element rings 6a''', 6b''', the innermost resilient element ring 6c'' experiencing too little centrifugal force and, thus, deformation to require this. The, liquid being contained in a single, outwardly-closed annular hollow space, only one sealing ring 14 suffices for dynamically sealing of that hollow space, in contrast to the embodiment shown in FIG. 3 and described above.

Subdividing the resilient element into radially-spaced, concentric, coaxial rings 6a''', 6b''', 6c'' in the embodiment shown in FIG. 4 reduces the overall axial length of the flywheel for the effective axial length of the resilient element achieved. The rings are coordinated with respect to their axial cross-sectional areas in such a way that, upon relative rotational displacement of the two flyrings, all three resilient rings are stressed alike. All three rings can be, therefore, manufactured from the same material of the same resilience, their manufacture thus being facilitated. The viscosity dampers are, as described similarly for FIG. 3, formed of projections 24a' projecting radially, outward of the disk 712, which, in the rotationally undisplaced state of the flyrings 1'', 2'' are, in the circumferential direction, in the middle of axially adjacent pockets between circumferentially-spaced boundary elements 24' of the first flyring 1''. The axial distance between the projections 24a' and the bottom of the pockets is approximately 3 times as big as the axial distance to the boundary elements 24' of the first flyring 1'', which results when the projections 24a' are moved by relative torsion circumferentially away from the pockets.

The damping efficiency increases correspondingly to the decreasing of the distance and characterizes the exceeding of the free travel.

Details of the execution and the function are described in the following by FIGS. 5 to 8.

FIGS. 5 and 6 and 7 and 8 respectively show two embodiments of viscosity dampers for flywheels as shown in FIG. 3 and 4 or other embodiments. Both viscosity dampers have two circular disks 712'', 712''', respectively, for respective connection to the flyrings or part thereof so as to be wet by a viscous liquid (not shown) thereabout in an annular hollow space of the flywheel. Each disk is attachable to a flyring (not shown) and securable against rotational displacement relative thereto for forming at least effectively, a fixed component thereof by fastening shaft 25a, 25b, 25c, 25d.

Figure 5:
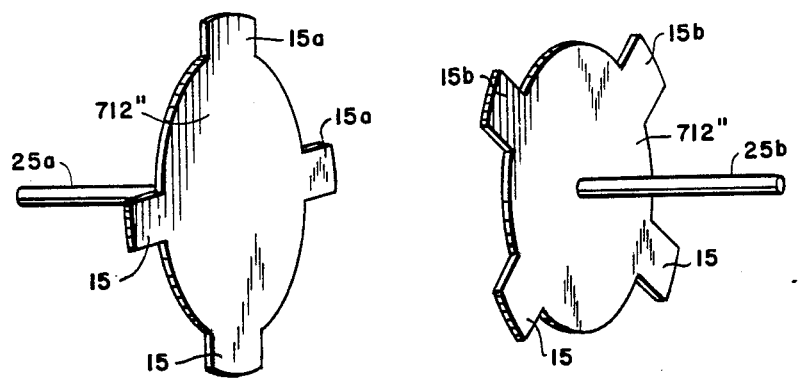
FIG. 5 is an exploded, schematic, perspective view of a viscosity damper portion of still another preferred embodiment.
Figure 6:
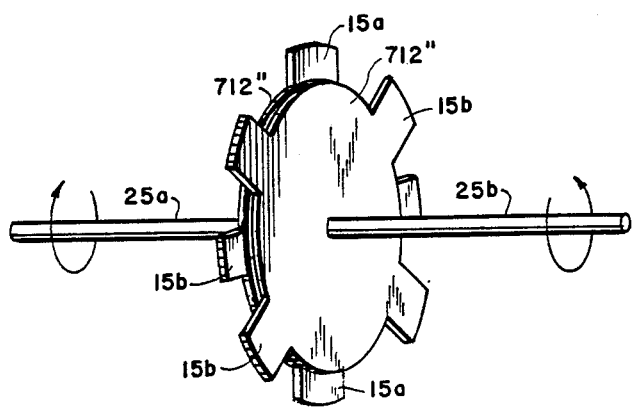
FIG. 6 is a schematic, perspective view of the viscosity damper portion of the preferred embodiment of FIG. 5.
Figure 7:
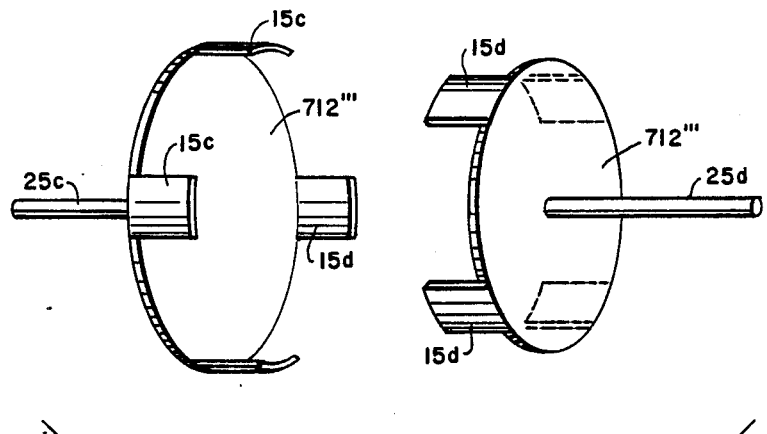
FIG. 7 is an exploded, schematic, perspective view of a viscosity damper portion of still another preferred embodiment.
Figure 8:
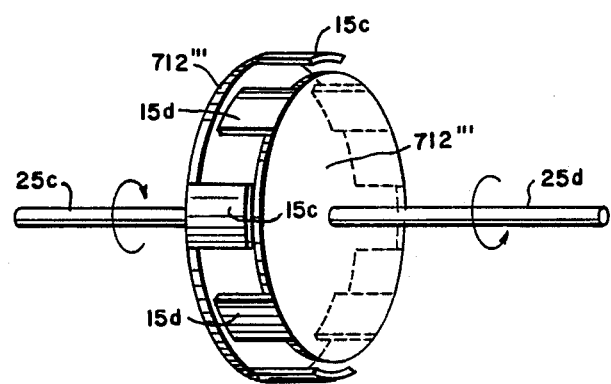
FIG. 8 is a schematic, perspective view of the viscosity damper portion of the preferred embodiment of FIG. 5.

Each disk has circumferentially-spaced damping projections 15a, 15b, 15c, 15d which, in the embodiment of FIGS. 5 and 6 (projections 15a, 15b), project radially outward and in the embodiment of FIGS. 7 and 8 (projections 15c, 15d), project axially toward each other.

When the disks have been fitted together for use as shown in FIGS. 6 and 8, the damping projections of the disks can move toward and then overlap in case of big relative rotational displacement of the flyrings, coming thereby in a very small clearance from another.

The latter increases the damping action of the viscous liquid wetting the disks.

In a non-overlapping state of the projections 15a and 15b results on the contrary a negligibly small damping effect. This state remains within the range of small torsion angles A and is described within the scope of the present invention as lost or free travel, in which only the resilient element is active.

The damping action of the liquid is substantially less with the embodiment of FIGS. 5 and 6 or negligible with the embodiment of FIGS. 7 and 8 so long as the opposed damping projections do not overlap. As they begin to overlap, the damping action increases steadily until maximum overlapping of the projections is attained. It is easy to see from this how the lost motion damping action thus produced can be adjusted so practically and characteristic by varying the mutual spacing of the damping projections and their sizes, or by modifying the viscosity of the wetting liquid. A relative lost-motion rotational displaceability before impeding of ±10 degrees has generally proved advantageous.

It will be appreciated that the instant specification and claims are set forth by way of illustration and not of limitation, and that various changes and modifications may be made without departing from the spirit and scope of the present invention.

What is claimed is:

1. A flywheel, comprising:
   first and second axially-spaced, coaxial flyrings;
   at least one resilient element, connected between said first and second flyrings, permitting relative rotational displacement therebetween during small relative rotational displacements of free travel up to about ±30°;
   damping means, connected between said first and second flyrings and operatively in parallel with said resilient element, for impeding the relative rotational displacement of the flyrings after said free travel;
   whereby the flyrings interact with respect to each other during said free travel only through the resilient element, and interact through the damping means in case of bigger displacements.

2. The flywheel of claim 1, wherein the free travel has a value of about ±10°.

3. The flywheel of claim 1, wherein the free travel has a value of about ±5°.

4. The flywheel of claim 1, wherein the flyrings have axially-oriented, radially-opposed retaining surfaces connected to the resilient element.

5. The flywheel of claim 1, wherein the flyrings have radially-oriented, axially-opposed retaining surfaces connected to the resilient element.

6. The flywheel of claim 1, and further comprising an annular, hollow space axially between the resilient element and at least one of the flyrings.

7. The flywheel of claim 6, wherein the annular hollow space is sealingly closed at least radially outwardly and axially for holding a liquid at least when the flywheel is rotating.

8. The flywheel of claim 7, wherein the damping means comprises (a) a liquid having a viscosity of from about 100 to about 200,000 centistokes disposed in the annular hollow space, and (b) means on one of the flyrings for rotation therewith and relative to the resilient element in the annular hollow space which is wetted by the liquid.

9. The flywheel of claim 8, wherein the damping means of one of the flyrings and the other flyring each have damping projections uniformly spaced from each other circumferentially for moving toward each other for the lost relative rotational displacement and past each other for the impeding thereafter.

10. The flywheel of claim 1, wherein the damping means comprises a driving disk connected to one of the flyrings for rotation therewith and frictionally engaging the other flyring for impeding the relative rotational displacement thereof.

11. The flywheel of claim 10, wherein the damping means further comprises dogs uniformly spaced circumferentially around said said the driving disk and dogs uniformly spaced circumferentially around said other flyring, the dogs of said other flyring being received in the spaces between the dogs of said driving disk and uniformly spaced therefrom, when the resilient element is unstressed, for engagement with each other for the impeding of the relative rotational displacement after the lost relative rotational displacement.

12. The flywheel of claim 10, and further comprising at least one friction lining between the driving disk and the other flyring for the frictional engagement therebetween.

* * * * *